United States Patent [19]
Sprague

[11] 3,961,952
[45] June 8, 1976

[54] MEROCYANINE PHOTOCONDUCTORS

[75] Inventor: Robert H. Sprague, Carlisle, Mass.

[73] Assignee: Itek Corporation, Lexington, Mass.

[22] Filed: June 4, 1973

[21] Appl. No.: 366,907

[52] U.S. Cl. .................................. 96/1.5; 96/1 R
[51] Int. Cl.$^2$ ........................................ G03G 5/04
[58] Field of Search ............... 96/1.5, 1.6, 127, 128, 96/1 R

[56] References Cited
UNITED STATES PATENTS

| | | | |
|---|---|---|---|
| 2,493,748 | 1/1950 | Brooker et al. | 96/128 |
| 2,519,001 | 8/1950 | Sprague | 96/128 |
| 3,287,123 | 11/1966 | Hoegl et al. | 96/1.5 |
| 3,597,196 | 8/1971 | Jones et al. | 96/1.5 |

OTHER PUBLICATIONS

Mees, The Theory of Photographic Processes 3r, ed. Macmillan & Co. 1966 p. 231.
Kearns 3/25/62 Thesis Lawrence Radiation Lab Cont. No. W-7405 eng 48.
Chem. Abs. vol. 41, 2988 (1947).

*Primary Examiner*—David Klein
*Assistant Examiner*—John L. Goodrow
*Attorney, Agent, or Firm*—Homer O. Blair; Robert L. Nathans; David E. Brook

[57] ABSTRACT

Photoconductive compositions are disclosed which are formed from merocyanine dyes, preferably dispersed in insulating binders.

12 Claims, No Drawings

MEROCYANINE PHOTOCONDUCTORS

BACKGROUND OF THE INVENTION

1. Field of the Invention

This invention relates to organic photoconductors, and more particularly to organic photoconductive compositions formed from merocyanine dyes.

2. Description of the Prior Art

Various photoconductive insulating materials have been used in electrophotographic processes. In xerography, the most widely used photoconductive material to date has been a thin coating of vitreous selenium. In Electrofax processes, the most widely used photoconductor has been zinc oxide dispersed in insulating, film-forming binders. More recently, organic photoconductive compositions have come to the forefront.

Merocyanine dyes have been known as sensitizing dyes for silver halide, as sensitizing dyes for photoconductive compositions, and as light sensitive materials useful in freeradical imaging systems. The merocyanine dyes of this invention have not, however, been used as pigment-type photoconductors for electrophotographic plates.

SUMMARY OF AN EMBODIMENT OF THE INVENTION

In one embodiment, the invention comprises the use of merocyanine dyes as photoconductive materials. These dyes can be coated upon suitable electrically conducting substrates either with or without binders. It is preferred to use an insulating binder material in which the merocyanine dyes are dispersed, and one suitable insulating binder is polystyrene.

Merocyanine pigment-type photoconductors as described herein have many advantages. For example, they may be synthesized in a wide range of structures having sensitivity to any desired part of the visible spectrum without the need for the addition of sensitizing dyes. Further, pigment dye coatings are not subject to fading and loss of sensitivity on repeated exposure as has been noted with dye sensitized systems. Another advantage is the compatibility of these merocyanine pigment dyes with a wide range of binders, in contrast to the narrow range of binders typically useful with inorganic photoconductors. Most importantly, many of the merocyanine dye pigments described herein have exceptionally high degress of sensitivity, approaching the sensitivities of the best photoconductors presently used in electrophotographic plates.

DESCRIPTION OF THE INVENTION

In preparing electrophotographic elements using merocyanine photoconductors of this invention, the dye compositions may be formulated and coated with or without a binder. When a binder is employed, the compound is dispersed in a solution of binder and solvent and then after thorough mixing, the composition is coated on an electrically conducting support in a well known manner such as swirling, spraying, doctor blade coating, etc. By "electrically conducting," is meant a dark resistivity of about $10^9$ ohm-centimeters or lower, and preferably of about $10^5$ ohm-centimeters or lower.

Suitable binders comprise polymers having fairly high dielectric strength and good electrically insulating characteristics. By "electrically insulating," is meant a dark resistivity of about $10^{14}$ ohm-centimeters or higher, and preferably of about $10^{16}$ ohm-centimeters or higher.

Examples of specific suitable binder materials include: styrene-butadiene copolymers; silicone resins; styrene-alkyd resins; silicone-alkyd resins; soya-alkyd resins; poly(vinyl chloride); poly(vinylidene chloride); vinylidene chloride; acrylonitrile copolymers; poly(vinyl acetate); vinyl acetate; vinyl chloride copolymers; poly(vinyl acetals), such as poly(vinyl butyral); polyacrylic and methacrylic esters, such as poly(methylmethacrylate), poly(n-butylmethacrylate), poly(isobutyl methacrylate), etc.; polystyrene; nitrated polystyrene; polymethylstyrene; isobutylene polymers; polyesters, such as poly(ethylenealkaryloxyalkylene terephthalate); phenol-formaldehyde resins; ketone resins; polyamide; polycarbonates; etc. Methods of making resins of this type have been described in the prior art, for example, styrene-alkyd resins can be prepared according to the method described in U.S. Pat Nos 2,361,019 and 2,258,423. Suitable resins of the type contemplated for uses in the photoconductive layers of the invention are sold under such trade names as Vitel PE-101, Cymac, Piccopale 100, and Saran F-220. Other types of binders which can be used in the photoconductive layers of the invention include such materials as paraffin, mineral waxes, etc.

Solvents of choice for preparing coating compositions of the present invention can include a number of solvents such as benzene, toluene, acetone, 2-butanone, chlorinated hydrocarbons, e.g., methylene chloride, ethylene chloride, etc., ethers, e.g., tetrahydrofuran, or mixtures of these solvents, etc.

Where a binder is used, it is satisfactory to have pigment/binder ratios of from about 2/1 to about 1/4. Preferably, the pigment/binder ratio is from about 1/1 to about 1.2.

The coating thickness of merocyanine dyes in solution can vary widely. In general, thicknesses, before drying, from about 0.0005 to about 0.01 inches should be suitable. Preferably, the wet coating thicknesses are from about 0.0015 to about 0.006 inches.

Suitable supporting materials for coating the photoconductive layers of the present invention can include any of the electrically conducting supports, for example, paper (at a relative humidity above 20%); aluminum-paper laminates; metal foils such as aluminum foil, zinc foil, etc.; metal plates, such as aluminum, copper, zinc, brass, and galvanized plates; regencrated cellulose and cellulose derivatives; certain polyesters, especially polyesters having a thin electroconductive layer (e.g., cuprous iodide) coated thereon; etc. Suitable supporting materials can also include the humidity-independent conducting layers of semiconductors dispersed in polymeric binders, as described in U.S. Pat. No. 3,112,192.

The elements of the present invention can be employed in any of the well known electrophotographic processes which require photoconductive layers. One such process is the xerographic process. In a process of this type, the electrophotographic element is given a blanket electrostatic charge by placing the same under a corona discharge which serves to give a uniform charge to the surface of the photoconductive layer. This charge is retained by the layer owing to the substantial insulating property of the layer, i.e., the low conductivity of the layer in the dark. The electrostatic charge formed on the surface of the photoconducting layer is then selectively dissipated from the surface of the layer by exposure to light through an image-bearing transparency by a conventional exposure operation such as, for example, by contact-printing technique, or by lens projection of an image, etc., to form a latent image in the photoconducting layer. By exposure of the surface in this manner, a charge pattern is created by virtue of the fact that light causes the charge to be conducted away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust, e.g., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Pat. No. 2,297,691, and in Australian Pat. No. 212,315. In processes of electrophotographic reproduction such as in xerography, by selecting a developing particle which has as one of its components, a low-melting resin, it is possible to treat the developed photoconductive material with heat and cause the powder to adhere permanently to the surface of the photoconductive layer. In other cases, a transfer of the image formed on the photoconductive layer can be made to a second support, which would then become the final print. Techniques of the type indicated are well known in the art and have been described in a number of United States and foreign patents, such as U.S. Pat. Nos. 2,297,691 and 2,551,582, and in "RCA Review," vol. 15, 1954, pp. 469–484.

The merocyanine photoconductors described herein can be sensitized or doped to improve their spectral response or sensitivity. In general, suitable sensitizers are known in the art, such as those described in U.S. Pat. No. 3,485,625 to Fox. The quantity of dopants needed can be exceptionally small, in fact, it can be so small that the difference between a doped and an undoped merocyanine dye sample can be so small that it ordinarily will not be detected by spectral photometry or paper chromatography. One family of suitable dopants is described in copending applications Ser. Nos. 366,906 and 366,910, both filed on June 4, 1973 in the names of Keller and Sprague. As will be seen by the examples which follow, many of these merocyanine dyes have exceptionally high speeds and should not require the addition of extrinsic doping agents.

As is known, merocyanine dyes are derived from quaternary salts of heterocyclic bases by condensation reactions with ketomthylene derivatives. These techniques are well described in the literature.

Representative examples of suitable heterocyclic bases include: 2-methylbenzothiazole; 2-methylbenzoxazole; 2-methylbenzimidazole; 2-methylthiazoline; Quinaldine; Lepidine; 1-methylisoquinoline; 2-methyl-α-naphthothiazole; 2-methyl-β-naphthothiazole; Alpha-picoline; Gamma-picoline; 3-methylisoquinoline; 2,4-dimethylthiazole; 2-methyl-4-phenylthiazole; 2-methylthiazole; 2,3,3-trimethylindolenine; 2,4-dimethylselenazole; 2-methylbenzoselenazole; 2,4-dimethyloxazole; 2-methyl-α-naphthoxazole; 2-methyl-β-naphthoxazole; 2-methyl-4,5,6,7-tetrahydrobenzothiazole; 2-methyl-4,5,6,7-tetrahydrobenzoxazole; 2-methyl-4,5-pentamethylenethiazole; 2-methyl-4,5-trimethylenethiazole; 2-methyl-6,7-dihydro-4-H-pyrano(4,3D)-thiazole; 2-methyl-6,7-dihydro-4-H-thiopyrano-(4,3D)thiazole; 2-methyl-5,6-dihydro-4-H-pyrano(3,2D)thiazole; and 2-methyl-5-phenylbenzoxazole.

Representative examples of suitable ketomethylene compounds include: 3-ethyl rhodanine; acetyl acetone; diethyl malonate; 3(2H)-thianaphthenone; 5-methoxy-3(2H)-benzofuranone; 1,3-indanedione; 3-phenyl-2,4-thiazolidinedione; 3-ethyl-2-thio-2,4-oxazolidinedione; 2-diphenylamino-4(5H)-thiazolone; 3-ethyl-1-phenyl-2-thiohydantoin; ethyl cyanoacetate; 3-p-carboxyphenylrhodanine; 3-methyl-1-p-sulfophenylpyrazolone; 3-methyl-1-phenyl-5-pyrazolone; 1-ethyloxindole; hippuric acid; 3-phenyl-5(4H)-isoxazolone; 1,3-diethylbarbituric acid; 1,3-diethyl-2-thiobarbituric acid; malonanilide; cyanoacetamide; cyanoacetanilide; benzoylacetonitrile; and 3-ethyl-2-phenylamino-4-thiazolone.

The heterocyclic nitrogen ring can be attached to the ketomethylene rings directly, or through methine carbon atoms. When connected through methine carbon atoms, there can be two, four or six methine carbon atoms.

The merocyanine dyes of this invention include simple merocyanines, merocarbocyanines, merodicarbocyanines, merotricarbocyanines, other meropolycarbocyanines, and the several types of so-called "complex" merocyanines including "rhodacyanines." Specified in terms of the number of rings and the number of methine carbon atoms, these dyes include dinuclear, trinuclear; dimethine, dinuclear; dimethine, trinuclear; tetramethine, dinuclear; tetramethine, trinuclear; hexamethine; etc.

The merocyanine dye compounds useful as photoconductors can, in general, be represented by the following structural formula:

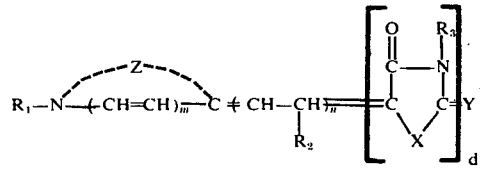

wherein:
R₁ is alkyl, unsaturated alkyl, hydroxyalkyl, alkoxyalkyl, acyloxyalkyl, carboxyalkyl, cycloalkyl, aryl, aralkyl or, heterocyclic;
Z represents the non-metallic atoms completing a 5 or 6 member heterocyclic ring;
m is equal to 0 or 1;
R₂ is hydrogen, alkyl, aryl or aralkyl;
n is equal to 1, 2, 3 or 4;
R₃ is hydrogen, lower alkyl or hydroxyalkyl;
X is O, Se, S or N—R' wherein R' is a monovalent alkyl or aryl group; and,
d is equal to 1, 2, 3 or 4;
Y represents

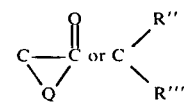

wherein Q represents the non-metallic atoms necessary to complete a heterocyclic ring and wherein R'' and R''' are individually selected from CN, COR and COOR while R is alkyl, aryl or aralkyl.

Illustrative suitable merocyanine photoconductive compositions can be represented by the following structural formulas:

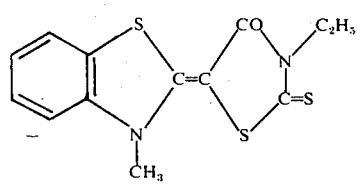

A.   5-(3-methyl-2-(3H)benzothiazolylidene)-3-ethyl rhodanine

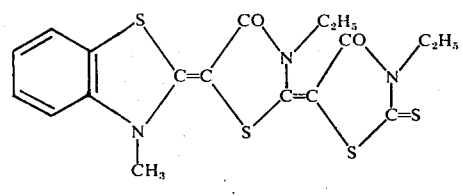

B.   5-(3-methyl-2(3H)benzothiazolylidene)-3-ethyl-2-(3-ethyl-4-oxo-2-thiono-5-thiazolyidene)-4-thiazolidone

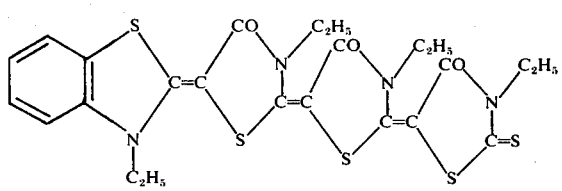

C.   5-(3-ethyl-2(3H)benzothiazolylidene)-3-ethyl-2-[2-(3-ethyl-4-oxo-2-thiono-5-thiazolylidene)-3-ethyl-4-oxo-5-thiazolylidene]-4-thiazolidone

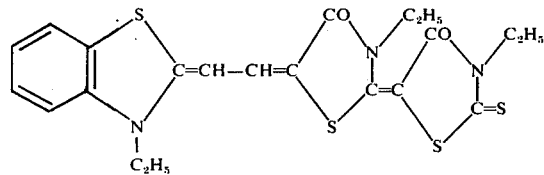

D.   5-[(3-ethyl-2(3H)benzothiazolylidene)ethylidene] 3-ethyl-2-(3-ethyl-4-oxo-2-thiono-5-thiazolylidene)-4-thiazolidone

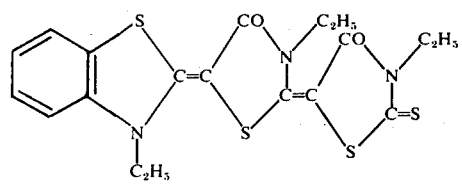

E.   3-ethyl-5-(3-ethyl-2(3H)benzothiazolylidene)-2-(3-ethyl-4-oxo-2-thiono-5-thiazolylidene)-4-thiazolidone

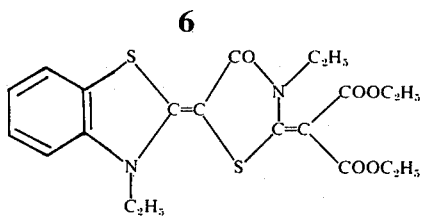

F.   3-ethyl-5-(3-ethyl-2(3H)benzothiazolylidene)-2-dicarbethoxymethylene-4-thiazolidone

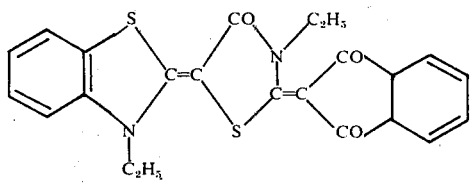

G.   3-ethyl-5-(3-ethyl-2(3H)benzothiazolylidene)-2-(1,3-dioxo-2-indanylidene)-4-thiazolidone

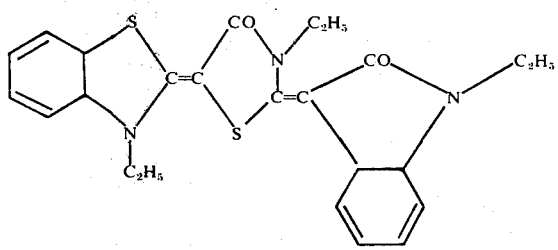

H.   3-ethyl-5-(3-ethyl-2(3H)benzothiazolylidene)-2-(1-ethyl-2-oxo-3-indolinylidene)-4-thiazolidone

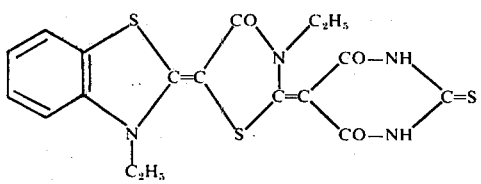

I.   3-ethyl-5-(3-ethyl-2(3H)benzothiazolylidene)-2-(4,6-dioxo-2-thiono-5-pyrimidylidene)-4-thiazolidone

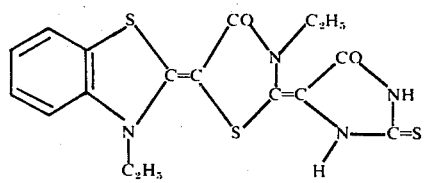

J.   3-ethyl-5-(3-ethyl-2(3H)benzothiazolylidene)-2-(4-oxo-2-thiono-5-imidazolylidene)-4-thiazolidone

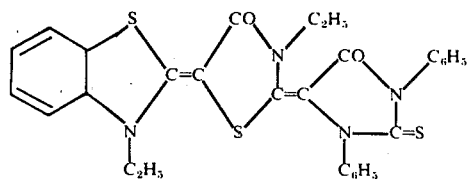

K. 3-ethyl-5-(3-ethyl-2(3H)benzothiazolylidene)-2-(1,3-diphenyl-4-oxo-2-thiono-5-imidazolylidene)-4-thiazolidone

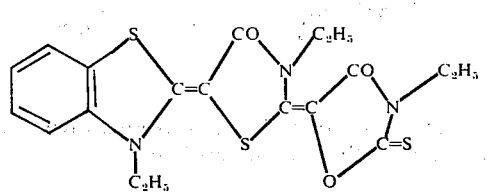

L. 3-ethyl-5-(3-ethyl-2(3H)benzothiazolylidene)-2-(3-ethyl-4-oxo-2-thiono-5-oxazolylidene)-4-thiazolidone

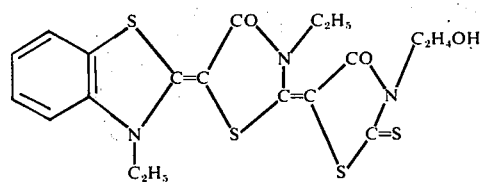

M. 3-ethyl-5-(3-ethyl-2(3H)benzothiazolylidene)-2-(3-β-hydroxyethyl-4-oxo-2-thiono-5-thiazolylidene)-4-thiazolidone

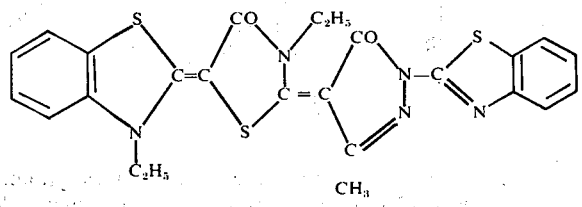

N. 3-ethyl-5-(3-ethyl-2(3H)benzothiazolylidene)-2-[1-(2-benzothiazolyl)-3-methyl-5-oxo-4-pyrazolylidene]-4-thiazolidone

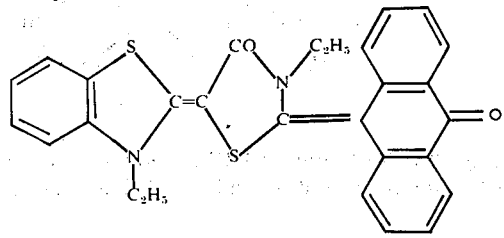

O. 3-ethyl-5-(3-ethyl-2(3H)benzothiazolylidene)2-(9-anthronylidene)-4-thiazolidone

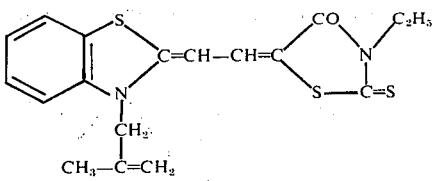

P. 3-ethyl-5-{[3-(2-methylpropenyl)-2(3H)benzothiazolylidene]ethylidene} rhodanine

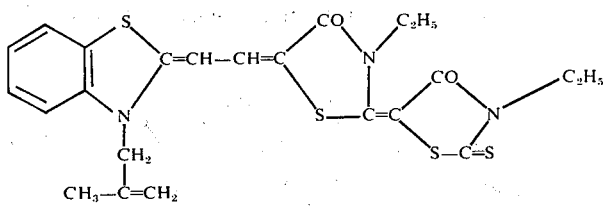

Q. 3-ethyl-5-{[3-(2-methylpropenyl)-2(3H)-benzothiazolylidene]ethylidene}-2-(3-ethyl-4-oxo-2-thiono-5-thiazolylidene)-4-thiazolidone

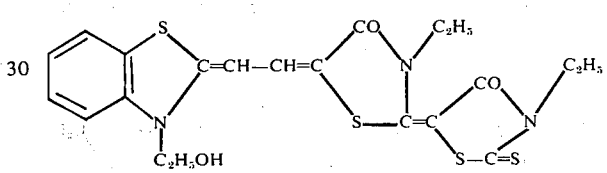

R. 3-ethyl-5-[(3-β-hydroxyethyl-2(3H)benzothiazolylidene)ethylidene]-2-(3-ethyl-4-oxo-2-thiono-5-thiazolylidene)-4-thiazolidone

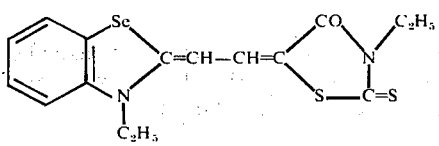

S. 3-ethyl-5-[(3-ethyl-2(3H)benzoselenazolylidene)ethylidene]-rhodanine

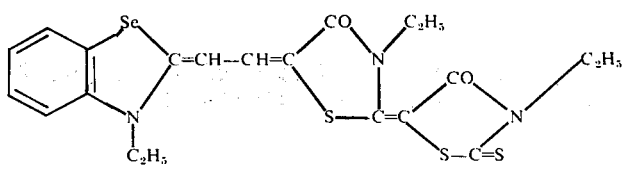

T. 3-ethyl-5-[(3-ethyl-2(3H)benzoselenazolylidene)ethylidene]-2-(3-ethyl-4-oxo-2-thiono-5-thiazolylidene)-4-thiazolidone

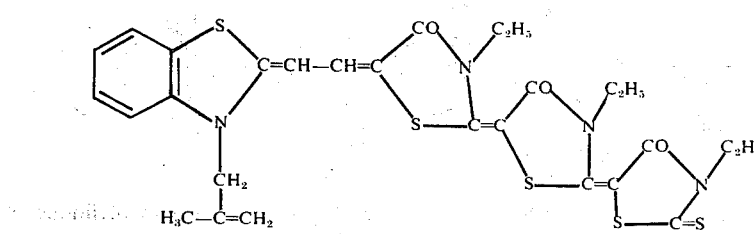

U. 3-ethyl-5-{[3-(2-methylpropenyl)-2(3H)benzothiazolylidene]ethylidene}-2-[3-ethyl-4-oxo-2(3-ethyl-4-oxo-2-thiono-5-thiazolylidene)-5-thiazolidylidene]-4-thiazolidone

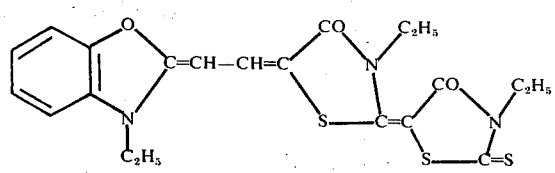

V. 3-ethyl-5-[(3-ethyl-2(3H)benzoxazolylidene)ethylidene]-2-(3-ethyl-4-oxo-2-thiono-5-thiazolylidene)-4-thiazolidone

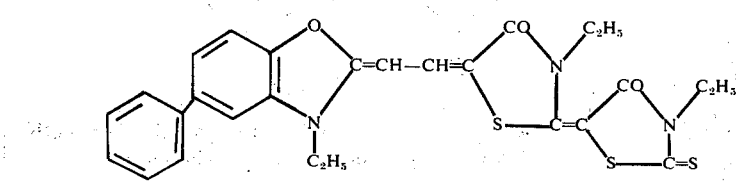

W. 3-ethyl-5-[(3-ethyl-5-phenyl-2(3H)benzoxazolylidene)ethylidene]-2-(3-ethyl-4-oxo-2-thiono-5-thiazolylidene)-4-thiazolidone.

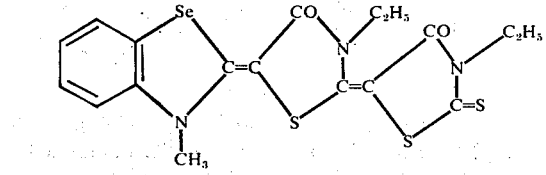

X. 3-ethyl-5-(3-methyl-2(3H)benzoselenazolylidene)-2-(3-ethyl-4-oxo-2-thiono-5-thiazolylidene)-4-thiazolidone

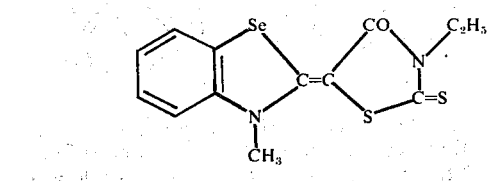

Y. 3-ethyl-5-(3-methyl-2(3H)benzoselenazolylidene) rhodanine

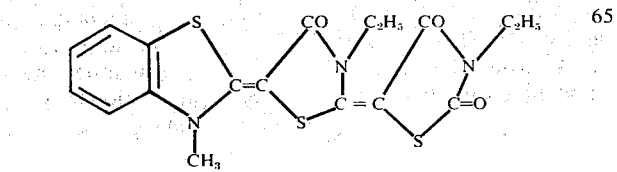

Z. 3-ethyl-5-(3-methyl-2(3H)benzothiazolylidene)-2-(3-ethyl-2,4-dioxo-5-thiazolylidene)-4-thiazolidone

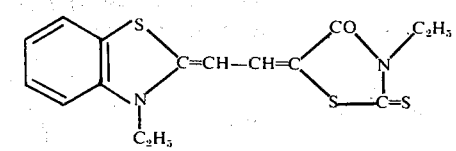

AA. 3-ethyl-5-[(3-ethyl-2(3H)benzothiazolylidene)ethylidene]rhodanine

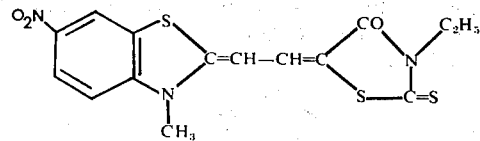

BB. 3-ethyl-5-[(3-methyl-6-nitro-2(3H)benzothiazolylidene)ethylidene] rhodanine

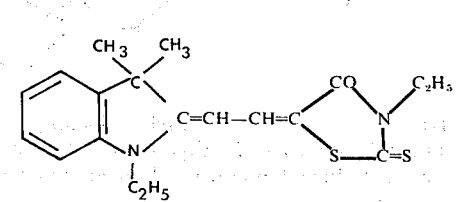

CC. 3-ethyl-5-[(1-ethyl-3,3-dimethyl-2-(3H)indolinylidene)ethylidene]rhodanine

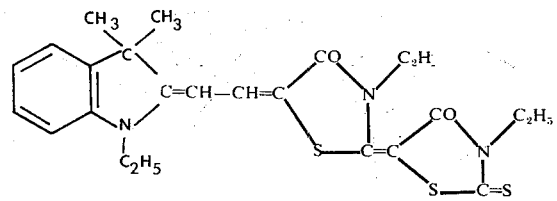

DD. 3-ethyl-5-[(1-ethyl-3,3-dimethyl-2(3H)-indolinylidene)ethylidene]-2-(3-ethyl-4-oxo-2-thiono-5-thiazolylidene)-4-thiazolidone

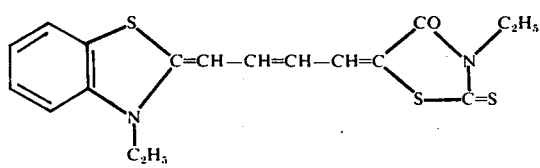

EE. 3-ethyl-5-[4-(3-ethyl-2(3H)benzothiazolylidene)2-butenylidene]rhodanine

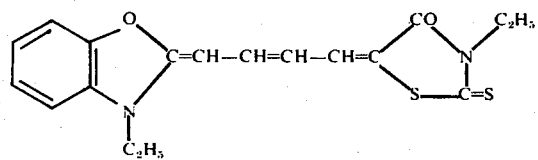

FF. 3-ethyl-5-[4-(3-ethyl-2(3H)benzoxazolylidene)-2-butenylidene] rhodanine

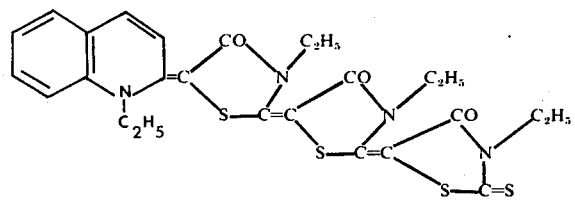

GG. 3-ethyl-5-(1-ethyl-2(1H)quinolylidene)-2-[3-ethyl-4-oxo-2-(3-ethyl-4-oxo-2-thiono-5-thiazolylidene)-5-thiazolidylidene]-4-thiazolidone

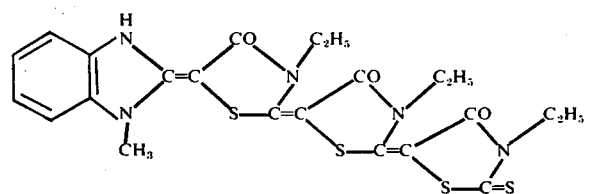

HH. 3-ethyl-5-(1-methyl-2(1H)benzimidazolylidene)-2-[3-ethyl-4-oxo-2-(3-ethyl-4-oxo-2-thiono-5-thiazolylidene)-5-thiazolidylidene]-4-thiazolidone

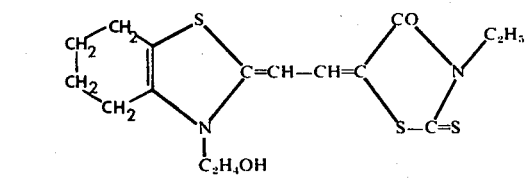

II. 3-ethyl-5-[(3-$\beta$-hydroxyethyl-4,5,6,7-tetrahydro-2(3H)benzothiazolylidene)ethylidene] rhodanine

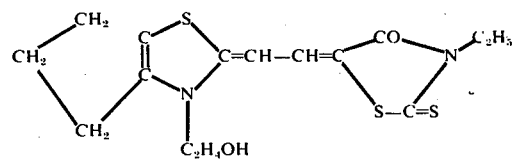

JJ. 3-ethyl-5-[(3-$\beta$-hydroxyethyl-4,5-trimethylene-2(3H)thiazolylidene)ethylidene]rhodanine

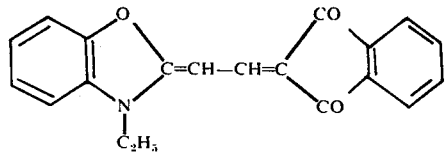

KK. 2-[(3-ethyl-2(3H)benzoxazolylidene)ethylidene]-1,3-indanedione

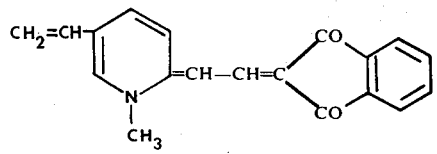

LL. 2[(1-methyl-5-vinyl-2(1H)pyridylidene)ethylidene]-1,3-indanedione

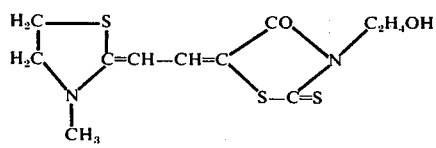

MM. 3-$\beta$-hydroxyethyl-5-[(3-methyl-2(3H)thiazolinylidene)ethylidene]rhodanine

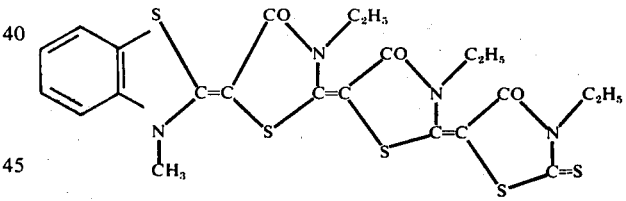

NN. 5-(3-methyl-2(3H)benzothiazolylidene)-3-ethyl-2-[2-(3-ethyl-4-oxo-2-thiono-5-thiazolylidene)-3-ethyl-4-oxo-5-thiazolylidene]-4-thiazolidone OO. 3-ethyl-5(1-ethyl-2-(1H)-quinolylidene)-2(e-ethyl-4-oxo-2-thiono-5-thiazolylidene)-4-thiazolidone In regard to the particular merocyanine dye used, several parameters should be considered. Dark decay, for example, appears to be associated with traces of impurities and can usually be reduced to acceptable levels by repeated recrystallization of the dye to purify it. As would be expected, increasing the number of rhodanine rings in these dyes shifts the absorption maximum to longer wavelengths. Also, the addition of rhodanine rings usually increases the sensitivity, regardless of the chain length.

Cycling fatigue may appear with some of these merocyanines. When it does appear, it does not appear to be due to a permanent change in the dye since the plate can be restored to its original state by a combination of exposure to light and allowing time for dissipation of residual charge trapped in the layer. Various techniques known by those skilled in electrophotography can be used to alleviate this problem.

The preferred merocyanine pigment-type photoconductors are those listed above by structural formulas B, C, D and EE. These four dyes have outstanding light sensitivity and form excellent photoconductive layers when they are dispersed in polystyrene binders.

The following examples further illustrate the invention. All parts and percentages are by weight unless otherwise specified.

Although the general techniques for preparing merocyanines are well known, three suitable preparations are given in Examples 1–3. The remaining examples, Examples 4–44, describe the results of actual sensitivity and dark decay tests on electrophotographic plates conducted using merocyanine photoconductor compositions as described herein.

EXAMPLE 1

Preparation of Compound B

Step (1) Preparation of N-methyl-2-methylmercapto benzothiazole methosulfate

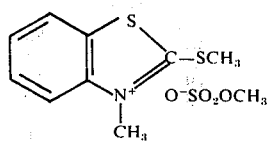

130 g. (1.03 moles) of dimethyl sulfate was added to a solution of 181.28 g. (1 mole) of 2-methylmercaptobenzothiazole in 15 ml. of acetone. The mixture was refluxed for 3 hours during which time a white solid starts to separate from the solution. After refluxing, the mixture was filtered and the solid washed well with acetone and dried. Yield 300 g. or 98% (theoretical 307g.) M.P.=185°–190° (gas evolution).

Step (2) Preparation of 3-ethyl-5-(3-methyl-2(3H)benzothiazolylidene)rhodanine

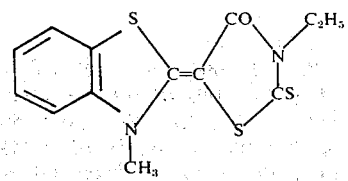

150 g. (1.5 moles) of triethylamine was added to a solution of 150 g. (0.49 moles) of N-methyl-2-methylmercaptobenzothiazolemethosulfate and 78.8 g. (0.49 moles) of 3-ethyl rhodanine in 2 liters of absolute alcohol and the mixture was refluxed in a steam bath for 30 minutes. Almost immediately a precipitate appeared. The reaction mixture was cooled, filtered and washed with absolute ethanol until the product was almost colorless. Yield 128.6 g. or 84% (theoretical 154 g.) M.P. 265°–268°.

Step (3) Preparation of 3-ethyl-5-(3-methyl-2(3H)benzothiazolylidene)4-methylmercapto-2-ketothiazolium-p-toluenesulfonate

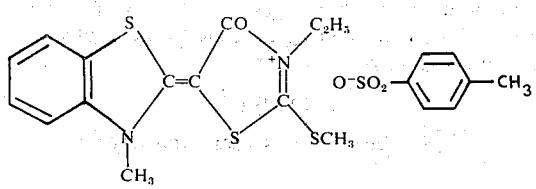

129 g. (0.42 moles) of the dye from step 2 and 156 g. (0.84 moles) methyl-p-toluenesulfonate were mixed together in a 2 liter, 3-necked flask fitted with a motor driven stirrer. The mixture was heated in an oil bath, and maintained under constant stirring at 130° for 2 hours. Solid was present at all times (red-orange colored mixture). At the end of the heating, acetone was added and the mixture was cooled in an ice bath. Filtering and washing with acetone continued until washings were almost colorless. Yield 180 g. or 87% (theoretical 207 g.) M.P. approximately 230° (gas evolution).

Step (4) Preparation of 3-ethyl-5-(3-methyl-2(3H)benzothiazolylidene)-4-(3-ethyl-2-keto-4-thiono-5-thiazolidene)-4-thiazolidone

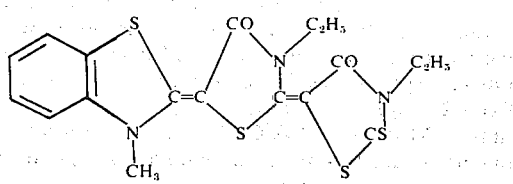

74 g. (0.74 moles) of triethylamine was added to a solution of 180 g. (0.365 moles) of the quaternary intermediate from step (3) and 59 g. (0.365 moles) of 3-ethyl rhodanine in 2 liters of absolute ethanol and the mixture was refluxed in a steam bath for 30 minutes. Almost immediately, a precipitate appeared. At the end of the reaction period, the mixture was cooled, filtered and the precipitate washed with absolute ethanol until the washings were almost colorless. Yield was almost quantitative, 155 g. or 98% (theoretical 159 g.). The crude material was then recrystallized from cresol in the following manner:

The crude dye was dissolved in boiling cresol in the ratio of 1.8 ml. cresol per gram of dye. The solution was cooled and approximately 25% of the dye crystallized out. The precipitate was filtered and triturated well with absolute methanol and dried. In order to get further crops, one can concentrate the cresol filtrate and add methanol to precipitate the dye.

After this procedure, the dye had the following characteristics: $\lambda max = 450$ nm. ($E = 1.03 \times 10^5$) shoulder at approximately 468 nm. M.P.>360°

EXAMPLE 2

Preparation of Compound NN

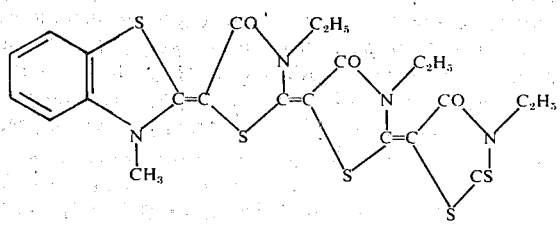

This dye was prepared in similar fashion by heating the product of Example 1 with excess methyl-p-toluene-sulfonate followed by reaction of the thus formed quaternary intermediate with 3-ethyl-rhodanine. After recrystallizations from cresol, the pure dye melted above 360°C. and had an absorption maximum at 564 nm. and a shoulder at 530 nm.

EXAMPLE 3

Preparation of Compound OO

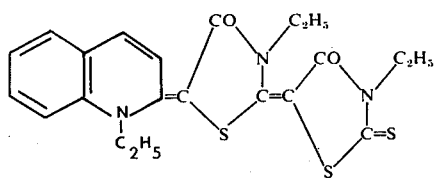

3.16 g. of 3-ethyl-5-(1-ethyl-2(1H)quinolylidene)rhodanine and 3.7 g. of methyl-p-toluene sulfonate were heated together at 170°C. for 5 minutes with stirring. The mixture was cooled; 1.6 g. of ethylrhodanine and 25 ml. of pyridine were added, and the mixture reheated to the boiling point. 3.0 g. of triethylamine was added and the mixture was boiled for 5 minutes. Dye separated rapidly from the boiling solution. The mixture was diluted with 200 ml. of methanol, cooled and filtered. The dye was washed on the filter with pyridine and methanol and dried. The yield of purple crystals was 3.9 g. After one recrystallization from 200 ml. of pyridine, 3.6 g. of pure dye was obtained. M.P. 301°–302°C. The dye has an absorption maximum at 556 nm. and a secondary maximum at 525 nm. in pyridine solution.

The 3-ethyl-5-(1-ethyl-2(1H)quinolylidene)rhodanine used above was prepared by condensing 7.86 g. of 2-phenylmercaptoquinoline ethiodide with 3.2 g. of 3-ethyl-rhodanine in 150 ml. of ethanol plus 3.0 g. of triethylamine. The mixture was boiled for 90 minutes, chilled and the dye was washed on the filter with methanol. The yield of crude dye was 5.7 g., and 5.2 g. of pure dye was obtained after one crystallization from 100 ml. of pyridine. The bright red crystals had a melting point of 201°–202°C., and the dye has two absorption maxima in pyridine solution at 483 nm. and 504 nm.

EXAMPLES 4–44

Electrophotographic plates containing merocyanine pigment type photoconductors as described herein were prepared as follows.

50 mg. of pigment was dispersed in ½ cc. of a 10% solution of polystyrene in tetrahydrofuran. This solution was coated onto a 0.006 inch grained aluminum plate by means of a Bird applicator to give a 0.003 inch wet thickness. The plate was dried for a minimum of 30 minutes at 100°C. before testing for dark decay and sensitivity on an electrostatic testing apparatus. This apparatus rotated the plate under a corona charger until the surface potential (measured on an oscilloscope) reached 500 volts. The charging current was shut off and the percent drop in voltage after 15 seconds was recorded (dark decay). The plate was then recharged to 500 volts and exposed to a 15 watt tungsten light source held 2 inches from the sample. Percent drop in voltage in 3 seconds was recorded as sensitivity. If 100% discharge, or amounts approaching 100% occurred in less than 3 seconds, the charge exposure cycle was repeated using a 0.5, 1.0 or 2.0 neutral density filter between the sample and the light source.

The following table presents dark decay and sensitivity data for various merccyanine photoconductors, determined according to the above procedure.

TABLE

| Ex. No. | Photoconductor | Dark Decay | Sensitivity |
|---|---|---|---|
| 4 | A | 4 | 4.2 |
| 5 | B | 10 | 100 - ½ sec. 25[1] |
| 6 | C | 12 | 100 - ½ sec. |
| 7 | D | 20 | 100 - ½ sec. 50[1] |
| 8 | E | 20 | 100 - 1 sec. 90[3] |
| 9 | F | 25 | 17 |
| 10 | G | 12 | 25 |
| 11 | H | 20 | 60 |
| 12 | I | 5 | 0 |
| 13 | J | 50 | 45 |
| 14 | K | 10 | 15 |
| 15 | L | 10 | 30 |
| 16 | M | 15 | 82 |
| 17 | N | 5 | 15 |
| 18 | O | 20 | 31 |
| 19 | P | 10 | 40 |
| 20 | Q | 20 | 80 - 1 sec. |
| 21 | R | 70 | 100 - 1½ sec. |
| 22 | S | 5 | 25 - 2 sec. |
| 23 | T | 10 | 100 - ½ sec. |
| 24 | U | 40 | 100 - ½ sec. |
| 25 | V | 15 | 60 - 2 sec. |
|  |  | 12 | 73 - 2 sec. |
| 26 | W | 20 | 100 - 1 sec. |
|  |  | 80 | 100 - ½ sec. |
| 27 | X | 16 | 80 - 1½ sec. |
| 28 | Y | 5 | 0 |
| 29 | Z | 33 | 90 - 1 sec. 40[2] 15[1] |
| 30 | AA | 15 | 68 - 2 sec. |
| 31 | BB | 20 | 30 |
| 32 | CC | 5 | 5 |
| 33 | DD | 10 | 88 - 2 sec. |
| 34 | EE | 30 | 100 - 1 sec. 60[1] |
| 35 | FF | 40 | 33 - 1 sec. |
| 36 | GG | 35 | 100 - 2 sec. |
| 37 | HH | 33 | 50 |
| 38 | II | 15 | 80 - 2 sec. 60[2] |
| 39 | JJ | 30 | 100 - ½ sec. 90[2] 50[1] |
| 40 | KK | 0 | 20 |
| 41 | LL | 50 | 68 - 2 sec. |
| 42 | MM | 60 | 55 |
| 43 | NN | 4 | 80 |
| 44 | OO | 20 | 10 |

[1] 2.0 neutral density filter
[2] 1.0 neutral density filter
[3] 0.5 neutral density filter

What is claimed is:

1. An electrophotographic element comprising an electrically conducting support material with a photoconductive coating thereon, said photoconductive coating consisting essentially of a photoconductive merocyanine dye pigment dispersed in an insulating binder with a pigment to binder ratio of from about 2/1 to about 1/4, wherein said merocyanine dye can be represented by the following structural formula:

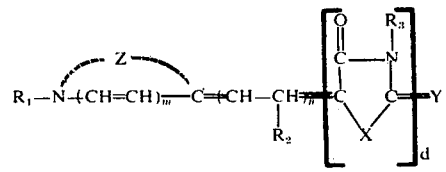

wherein:
R₁ is alkyl, unsaturated alkyl, hydroxyalkyl, alkoxyalkyl, acyloxyalkyl, carboxyalkyl, cycloalkyl, aryl, aralkyl or, heterocyclic;
Z represents the non-metallic atoms completing a 5 or 6 member heterocyclic ring;
m is equal to 0 or 1;
R₂ is hydrogen, alkyl, aryl or aralkyl;
n is equal to 0, 1, 2, 3 or 4;
R₃ is hydrogen, lower alkyl or hydroxyalkyl;
X is O, Se, S or N—R' wherein R' is a monovalent alkyl or aryl group; and,
d is equal to 1, 2, 3 or 4;
Y represents

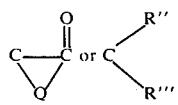

wherein Q represents the non-metallic atoms necessary to complete a heterocyclic ring and wherein R'' and R''' are individually selected from CN, COR and COOR where R is alkyl, aryl or aralkyl.

2. An element of claim 1 wherein said electrically conducting support comprises metal.

3. An element of claim 2 wherein said photoconductive coating has a wet thickness of from about 0.0005 inches to about 0.01 inches.

4. An element of claim 3 wherein said merocyanine is represented by the following structural formula:

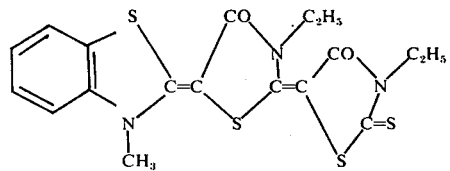

5. An element of claim 3 wherein said merocyanine is represented by the following structural formula:

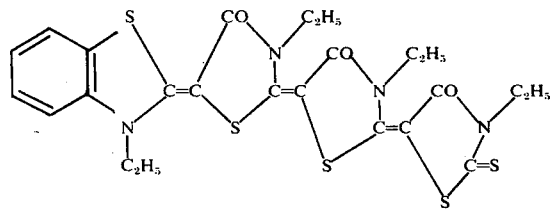

6. An element of claim 3 wherein said merocyanine is represented by the following structural formula:

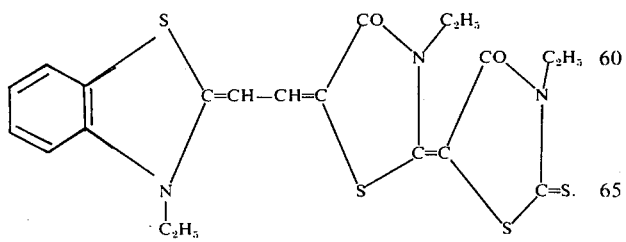

7. An element of claim 3 wherein said merocyanine represented by the following structural formula:

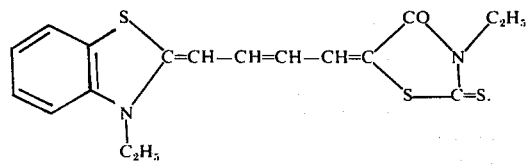

8. An element of claim 5 wherein said metal support comprises aluminum.

9. An element of claim 1 wherein said insulating binder comprises polystyrene.

10. An element of claim 8 wherein said insulating binder comprises polystyrene.

11. In an electrophotographic process wherein a photoconductive layer is charged and exposed to provide an electrostatic charge pattern, the improvement wherein said photoconductive layer consisting essentially of a photoconductive merocyanine dye pigment dispersed in an insulating binder with a pigment to binder ratio of from about 2/1 to about 1/4 having the following structural formula:

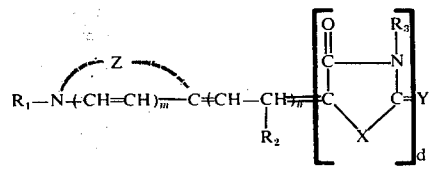

wherein:
R₁ is alkyl, unsaturated alkyl, hydroxyalkyl, alkoxyalkyl, acyloxyalkyl, carboxyalkyl, cycloalkyl, aryl, aralkyl or, heterocyclic;
Z represents the non-metallic atoms completing a 5 or 6 member heterocyclic ring;
m is equal to 0 or 1;
R₂ is hydrogen, alkyl, aryl or aralkyl;
n is equal to 0, 1, 2, 3 or 4;
R₃ is hydrogen, lower alkyl or hydroxyalkyl;
X is O, Se, S or N—R' wherein R' is a monovalent alkyl or aryl group; and,
d is equal to 1, 2, 3 or 4;
Y represents

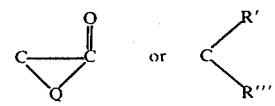

wherein Q represents the non-metallic atoms necessary to complete a heterocyclic ring and wherein R'' and R''' are individually selected from CN, COR and COOR where R is alkyl, aryl or aralkyl.

12. An improvement of claim 11 wherein said merocyanine dye is represented by the following structural formula:

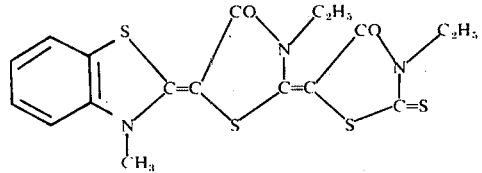

* * * * *